US007962359B2

(12) United States Patent
Montoya (10) Patent No.: US 7,962,359 B2
(45) Date of Patent: Jun. 14, 2011

(54) METHOD AND SYSTEM FOR COLLECTING AND DISSEMINATING SURVEY DATA OVER THE INTERNET

(75) Inventor: Patrick Montoya, Ann Arbor, MI (US)

(73) Assignee: Autopoll, Inc., Ann Arbor, MI (US)

( * ) Notice: Subject to any disclaimer, the term of this patent is extended or adjusted under 35 U.S.C. 154(b) by 1599 days.

(21) Appl. No.: 09/826,786

(22) Filed: Apr. 5, 2001

(65) Prior Publication Data

US 2001/0047292 A1 Nov. 29, 2001

Related U.S. Application Data

(60) Provisional application No. 60/195,127, filed on Apr. 6, 2000, provisional application No. 60/255,491, filed on Dec. 15, 2000.

(51) Int. Cl.
*G06F 17/30* (2006.01)
(52) U.S. Cl. .......................................................... 705/10
(58) Field of Classification Search .................... 705/10, 705/14
See application file for complete search history.

(56) References Cited

U.S. PATENT DOCUMENTS

| | | | | | |
|---|---|---|---|---|---|
| RE31,951 | E | * | 7/1985 | Johnson et al. ................. | 700/90 |
| 4,603,232 | A | * | 7/1986 | Kurland et al. ............ | 379/92.04 |
| 5,526,257 | A | * | 6/1996 | Lerner ............................. | 705/10 |
| 5,668,953 | A | * | 9/1997 | Sloo ................................... | 705/1 |
| 5,950,172 | A | * | 9/1999 | Klingman ........................ | 705/26 |
| 6,102,287 | A | * | 8/2000 | Matyas, Jr. ..................... | 235/380 |
| 6,151,707 | A | * | 11/2000 | Hecksel et al. ................ | 717/178 |
| 6,189,029 | B1 | * | 2/2001 | Fuerst ............................. | 709/217 |
| 6,311,190 | B1 | * | 10/2001 | Bayer et al. ................. | 707/104.1 |
| 6,330,608 | B1 | * | 12/2001 | Stiles ............................... | 709/229 |
| 6,510,427 | B1 | * | 1/2003 | Bossemeyer et al. ............. | 707/6 |
| 6,618,504 | B1 | * | 9/2003 | Yoshino ......................... | 382/187 |
| 6,654,726 | B1 | * | 11/2003 | Hanzek ............................. | 705/26 |
| 6,735,572 | B2 | * | 5/2004 | Landesmann .................... | 705/14 |
| 6,739,508 | B2 | * | 5/2004 | Ushioda et al. ................ | 235/386 |
| 6,760,727 | B1 | * | 7/2004 | Schroeder et al. ............... | 707/10 |
| 6,807,518 | B1 | * | 10/2004 | Lang .................................. | 703/2 |
| 6,819,759 | B1 | * | 11/2004 | Khuc et al. ..................... | 379/309 |
| 6,963,848 | B1 | * | 11/2005 | Brinkerhoff ..................... | 705/10 |
| 7,143,089 | B2 | * | 11/2006 | Petras et al. ...................... | 707/5 |
| 7,310,350 | B1 | * | 12/2007 | Shao et al. ..................... | 370/466 |

OTHER PUBLICATIONS

"Visitors welcomed to the Lexus Centre of Performance Art, the automaker's world wide web site". Mar. 1, 1996. from dialog file 813-0920381.*
Heney, Paul J. Web Wire Hydraulics and Pneumatics v52, n4 pp102 Apr. 1999.*
MutualDiscover.com Selects Five Mutual Funds with the Best Oulook for 1999. Business Wire Friday, Apr. 19, 1999.*

* cited by examiner

*Primary Examiner* — Johnna R Loftis
(74) *Attorney, Agent, or Firm* — Gifford, Krass, Sprinkle, Anderson & Citkowski, P.C.

(57) ABSTRACT

A system and method for collecting and disseminating survey information wherein a verification procedure is performed to determine actual ownership of the product by the respondent being surveyed on that product.

13 Claims, 5 Drawing Sheets

METHOD AND SYSTEM FOR COLLECTING AND DISSEMINATING SURVEY DATA OVER THE INTERNET

CROSS-REFERENCE TO RELATED APPLICATIONS

This application claims benefit of U.S. provisional application No. 60/195,127, filed Apr. 6, 2000, and U.S. provisional application 60/255,491, filed Dec. 15, 2000.

FIELD OF INVENTION

This invention relates to electronic commerce. More specifically, this invention relates to a system and method for collecting and distributing survey information.

BACKGROUND OF THE INVENTION

The internet is an extensive network of computers and computer networks interconnected through communication links. The computers on the internet exchange information using many services such as the World Wide Web (WWW) and Email. The WWW allows a server computer system (i.e. Web server or Web site) to send graphical information or Web pages to another computer connected to the internet (client computer system). The client computer system can interpret the Web page information and display it graphically using a Web browser.

Every Web page on the WWW can be uniquely identified with a Uniform Resource Locator or URL. Typically, to view a specific Web page on the internet a client computer system specifies the URL for that Web page on the browser to make a request that is sent to the Web server that supports that page. When the Web server receives the request, it sends that Web page to the client computer system. When the client computer system receives that Web page, it will then display the Web page using the browser. When the client computer displays a Web page from the Web site, it is said to be connected to that Web site. For the purposes of this disclosure, a Web site consists of the server computer system and peripherals (computer, CPU, software, memory (RAM, ROM) storage devices, databases, communication links, etc.) and personnel operating the site.

The internet, and more specifically the World Wide Web is an ideal medium for conducting surveys because a vast number of potential survey respondents have access to the WWW through client computer systems. Surveys related to such things as automobile owner satisfaction, consumer products, political issues, television programs, opinion polls, etc., can be effectively and inexpensively conducted over the Internet.

Many merchant or search engine Web sites ask "pop-up" survey questions related to various subjects, such as the Web sites themselves (i.e. rate the site) or perhaps to political issues (i.e. who will you vote for?). However, the results of such surveys are limited in that they are biased toward the opinions of respondents who happen to be purchasers of the specific merchants products or users of a specific search engine. Moreover, there is no assurance that malicious individuals have not provided multiple responses to the same survey question thereby skewing the results.

A Web site located at www.epinions.com enables registered members to express their opinion on a subject, service, or a product, by writing a review on the product, service or subject. The incentive to write a review is the potential of earning cash rewards through a scheme whereby a member who wrote a review receives royalties when another member rates the review. Whereas there may be the potential of earning a sum of money, the incentive is based on the ability to write a good review, as well as the respondent's availability of time to write a good review. Thus the potential respondent pool is limited. Furthermore, there is no method of verification that the reviewer actually owns, or has used the product or service she or he is writing a review about.

Another WWW site dedicated to collecting survey information can be located at www.Carvoice.com. This site specializes in automotive owner satisfaction surveys. This Web site requires that respondents provide their Email address to ensure that single individuals do not provide multiple responses. However, providing an Email address does not prove that the respondent actually owns or has used the vehicle surveyed. Moreover many Internet users have multiple Email addresses, thus allowing them to provide multiple responses to the same question under different Email addresses.

Thus consumers on the Internet who are interested in finding survey results on a specific product or any subject must rely on Web sites that have a limited respondent pool and/or questionable results.

Accordingly, it is an object of this invention to provide a survey method and system which overcomes the limitations and disadvantages of the prior art.

One object of the present invention is to provide for a consumer surveying Web site where consumers can provide and obtain reliable and verifiable survey results.

Another object of this invention is to provide a survey method and system where the general consumer car owner population is an inherently interested respondent, thus enabling the establishment of an extensive unbiased sampling pool of respondents.

A further object of this invention is to provide a survey method and system where product satisfaction surveys are conducted and distributed, and where the respondents' ownership of the surveyed product is verified.

Still another object of this invention is to allow for a continuously updated body of survey results as respondents can continuously provide survey data by answering new or updating previous survey questionnaires.

SUMMARY OF THE INVENTION

The present invention provides for a method and system for effectively collecting and disseminating reliable survey data over the Internet. The method is carried out on the World Wide Web with a "Web site" dedicated to providing and collecting product owner satisfaction survey information by making available survey results of previously collected surveys to consumers who have access to the WWW. Similarly, the general product owner population may access the Web site to provide survey information by answering the questions from a survey questionnaire on a specific product, such as a car model, make and year. The survey results may contain information such as the survey questions themselves, the collective response from all respondents to the survey questions, or perhaps an individual respondent's written answer to a specific question. For example:

| Question: | Rate the overall performance rating of this car. |
|---|---|
| Collective response: | Bad (8%), Marginal (10%), Ok (22%), Good (30%), Excellent (30%) |
| or | |
| Question: | Would you recommend this vehicle to a friend? |

| | |
|---|---|
| Collective response: or | No (22%), Yes (78%) |
| Question: | Rear seating is comfortable? |
| Collective response: or | Strongly disagree (15%), Disagree (12%), No opinion (5%), Agree (40%), Strongly Agree (28%) |
| Question: | Describe in your words your overall experience with this car. |
| Individual response: | "I hate it! I would never buy that car again or recommend it to a friend." |

In the method of the present invention, people (such as consumers) are required to respond to a survey questionnaire in order to have access to previously collected survey results. The survey questionnaire that the person responds to relates to a product (such as an automotive vehicle, motor bike, marine vehicle, home appliance or other product that can be specifically identified by make, model or serial number) that person currently owns (i.e. purchased with a loan) or leases. Thus in the present invention, one incentive for a potential respondent to answer a survey questionnaire is to access previously collected survey results. Generally, it is expected that the specific subject of the survey results sought by a person will be different from the specific subject of the survey that person responds on the Web site.

The method described provides for an unbiased source of survey results because the survey results provided by the Web site to one individual originated from a pool of respondents who answered a survey questionnaire related to a different subject in order to obtain survey results related to another subject. For example, a person interested in obtaining previously collected survey results related to owner satisfaction of a 2001 Toyota Camry might respond to a survey questionnaire related to their currently owned vehicle, such as a 1995 Chevrolet Lumina.

Once the respondent answers a survey questionnaire, his or her answers are combined (e.g. statistically) with the previously collected survey results related to the same subject (i.e. a specific make, model, and year of a car). Thus the present method provides for a continually updated body of survey results. Survey answers are stored in a survey answers database.

In a preferred embodiment, people must register with the Web site to have access to previously collected survey results. The registration process includes responding to a survey questionnaire (thus satisfying the aforementioned requirement to access survey results). Once registered, members can return to the site at a later time to update their previous survey answers or provide new survey information.

To help ensure that malicious survey respondents do not provide multiple or fake answers to the survey questionnaires, the proposed method requires that respondents provide a product identification number (such as the vehicle identification number (VIN) or serial number) of the surveyed product in order for verification of identity and/or vehicle ownership. This can be accomplished (over computer networks) by accessing external public and/or private databases such as an automobile manufacturer's sales records database. Verification may entail accessing the appropriate database to check that the specific product identified by the VIN or serial number actually exists (i.e. was manufactured), or is registered to or owned by the respondent. Verification is accomplished either in real time (while respondent is connected to the Web site) or in a batch process (at a time other than when the respondent is connected to the Web site). Survey answers from respondents who fail verification are discarded and not added to or combined with previously collected survey results.

To further encourage product owners or lessees to connect to the Web site and answer a new, or update a survey questionnaire, the present method provides for granting respondents a chance to payoff the balance of any loan, lease or credit card balance, the respondent has on the surveyed product identified by the VIN or serial number. Thus, in exchange for answering a survey on the Web site, survey respondents can be entered in a drawing for a chance to win the payoff of the lease, loan or credit card balance that the respondent has on the surveyed product.

Further benefits, advantages and features of the invention will become apparent to those skilled in the art from a review of the following drawings, description and appended claims.

DETAILED DESCRIPTION OF THE PREFERRED EMBODIMENT

To facilitate a complete understanding of the invention, the description of the preferred embodiment is arranged within the following sections:

| | |
|---|---|
| 1. | Terms and Acronyms |
| 2. | System Components |
| 3. | Operation |
| 4. | Conclusion |

1. Terms and Acronyms

The following terms and acronyms are used throughout the detailed description:

Client-Server. A model of interaction in which a program at one site sends a request to a program at another site and waits for a response. The requesting computer program is called the "client", and the computer program which responds to the request is call the "server". In the context of the World Wide Web (discussed below and the examples presented herein), the client includes a "Web browser" (or simply "browser") which runs on the computer of a user; the computer and/or program which responds to browser's requests by distributing Web pages is commonly referred to as a "Web server."

Hyperlink. A navigational link from one document to another, or from one portion (or component) of a document to another. Typically, a hyperlink is displayed as a highlighted work or phrase that can be selected by clicking on it using a mouse to jump to the associated document or documented portion.

Hypertext System. A computer-based informational system in which documents (and possibly other types of data entities) are linked together via hyperlinks to form a user-navigable "Web".

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML, XML and other languages. However, the terms "Web" and World Wide Web" are intended to encompass future markup languages and transport protocols which may be used in place of (or in addition to) HTML, XML and HTTP.

Web Site. A computer system that serves informational content over a network using the standard protocols of the World Wide Web. Typically, a Web site corresponds to a particular Internet domain name, such as "autopoll.com", and includes the content associated with the owner of the Web site as well as hyperlinks to other Web sites. As used herein the term is generally intended to encompass both (i) the hardware/software server components that serve the informational content over the network, and (ii) the "back end" hardware/software server components, including any non-standard or specialized components, that interact with the server components to perform services for Web site users.

HTML (HyperText Markup Language) and XML. Standard coding conventions and set of codes for attaching presentation and linking attributes to informational content within documents. During a document authoring stage, the HTML or XML codes (referred to as "tags") are embedded within the informational content of the document. When the Web document (or HTML or XML document) is subsequently transferred from a Web server to a browser, the codes are interpreted by the browser and used to parse and display the document. Additionally in specifying how the Web browser is to display the document, tags can be used to create links to other Web documents (commonly referred to as "hyperlinks").

HTTP (HyperText Transport Protocol). The standard World Wide Web client-server protocol used for the exchange of information (such as HTML and XML documents, and client requests for such documents) between a browser and a Web server. HTTP includes a number of different types of messages which can be sent from the client to the server to request different types of server actions. For example, a "GET" message, which has the format GET<URL>, causes the server to return the document or file located at the specified URL.

URL (Uniform Resource Locator). A unique address which fully specifies the location of a file or other resource on the Internet. The general format of a URL is protocol://machine address:port/path/filename. The port specification is optional, and if none is entered by the user, the browser defaults to the standard port for whatever service is specified as the protocol.

2. Overview of System Components

Figure 1:
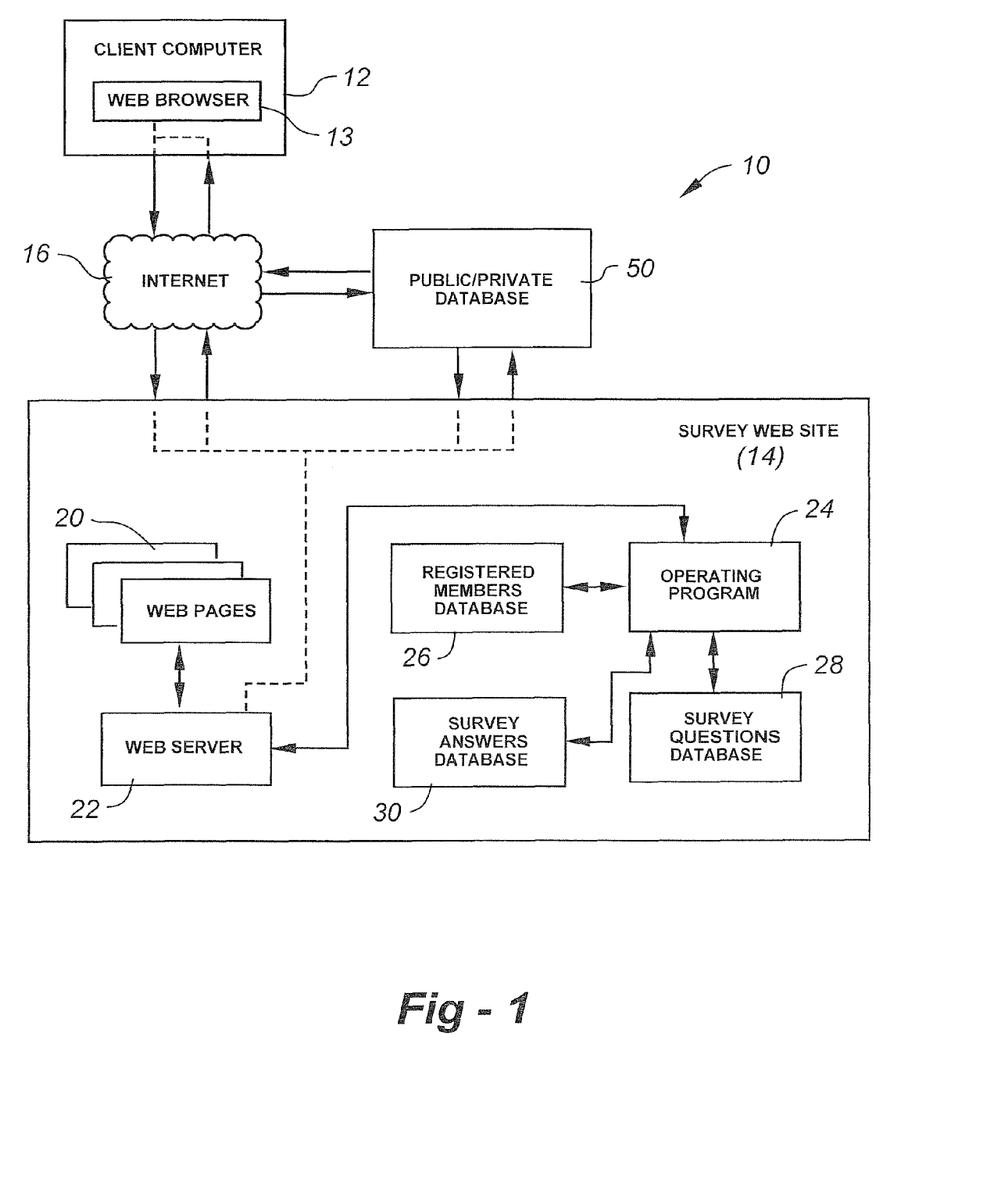
FIG. 1 is a block diagram of the primary components of a system that operates in accordance with the present invention.

Referring now to the drawings, FIG. 1 illustrates the general architecture of a survey system 10 that operates in accordance with the principles of the present invention. The system includes a client computer 12 and a survey Web site 14, which are linked together by the Internet 16. The client computer 12 may be any type of computing device that allows the user (the client) to interactively browse Web sites via a Web browser 18. For example, the client computer 12 may be a personal computer (PC) running on a "Windows™" operating system and utilizing an Internet Explorer™ Web browser. Both Windows™ and Internet Explorer™ are commercially available software from Microsoft Corporation. Other operating systems and Web browsers may also be used.

The survey Web site 14 is a site that provides various functions for allowing clients to request particular survey results. In order to receive the requested results, the client requesting the results must be a registered user or member of the survey Web site 14. In order to become a registered member, the client must answer a survey on a product currently owned by the client.

In the discussion and examples which follow, the product referenced throughout is an automobile. It should be expressly understood that while an automobile is discussed in connection with the present invention, the invention is not strictly limited to employment with automobiles. Any product whose ownership can be verified though an identification number, serial number, warranty registration, or other means could be the subject of the system of the present application.

The survey Web site consists of a series of Web pages 20. In response to a request using HTTP protocol communicated from the Web browser 18 of the client computer 12, the Web pages (HTML or XML) are transmitted to the client computer 12 via the Internet 16 by a Web server 22. The Web server 22 may be any type of computing device that is set up for hosting a Web site. Such computing devices are well known and conventional. As further described below, the survey Web site 14 further utilizes a software or operating program 24 which assembles and maintains a registered member database 26, a survey questions database 28, and a survey answers database 30 and other databases as may be specified.

3. Operation

Figure 2:
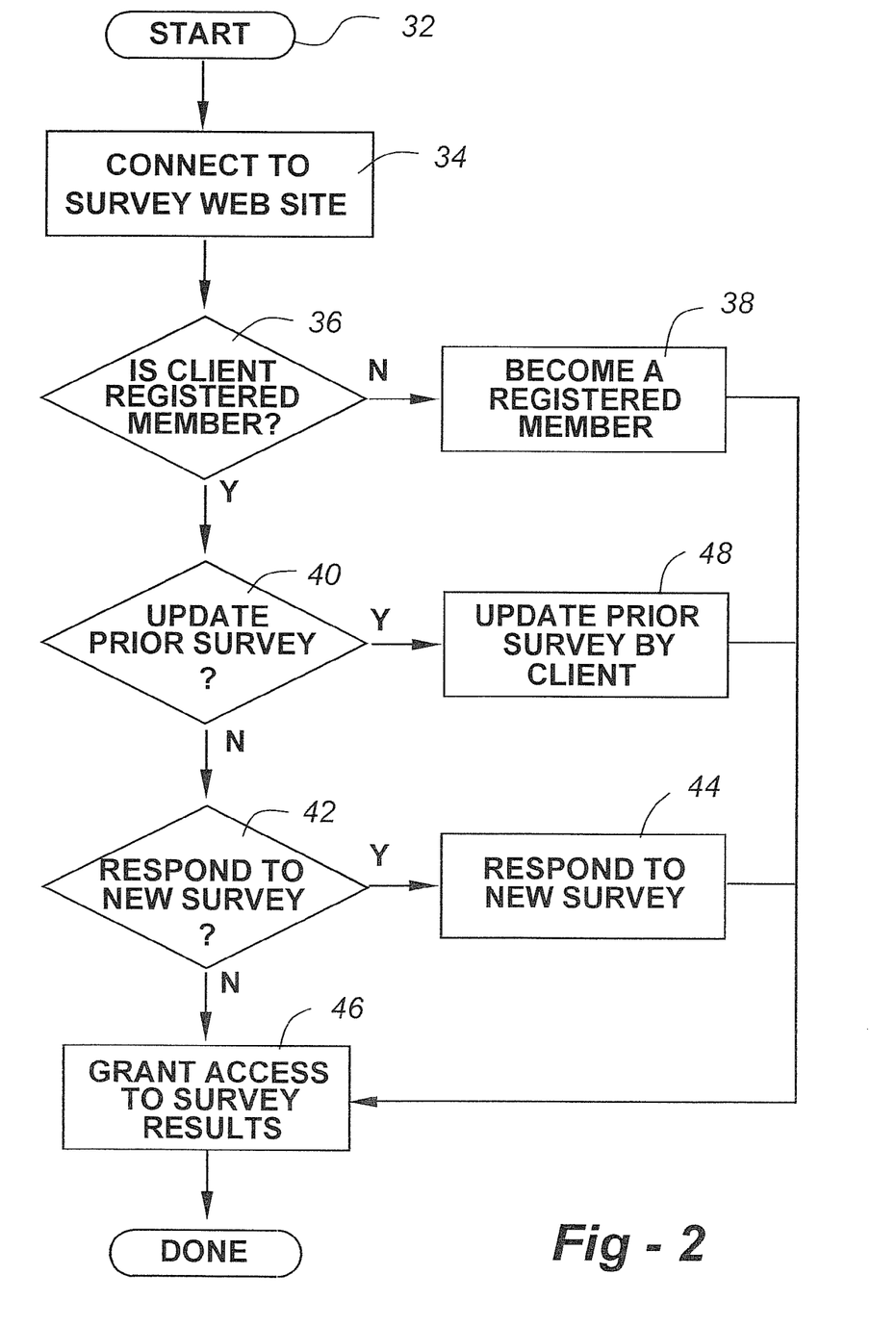
FIG. 2 is a flow diagram illustrating at least some of the steps taken in practicing the present invention.

Interaction between the client computer and the survey Web site 14 generally proceeds along the flow diagram illustrated in FIG. 2. From the start box 32, the individual or client connects to the survey Web site at box 34. At box 36, it is determined if the client is already a registered member with the survey Web site 14. If the client is not a registered member, the client then must become a registered member, as indicated at box 38 and as further discussed below. If the client is already a registered member, it is then determined if the client wishes to update a prior survey at box 40 or if the client wishes to respond to a new survey at box 42. If the client wishes to respond to a new survey, the client responds to the new survey as indicated at box 44 and is then granted access to the survey results as indicated in box 46. If the client wishes to update a prior survey the client updates a prior survey as indicated in box 48 and is then granted access to the survey results as indicated in box 46.

Figure 5:
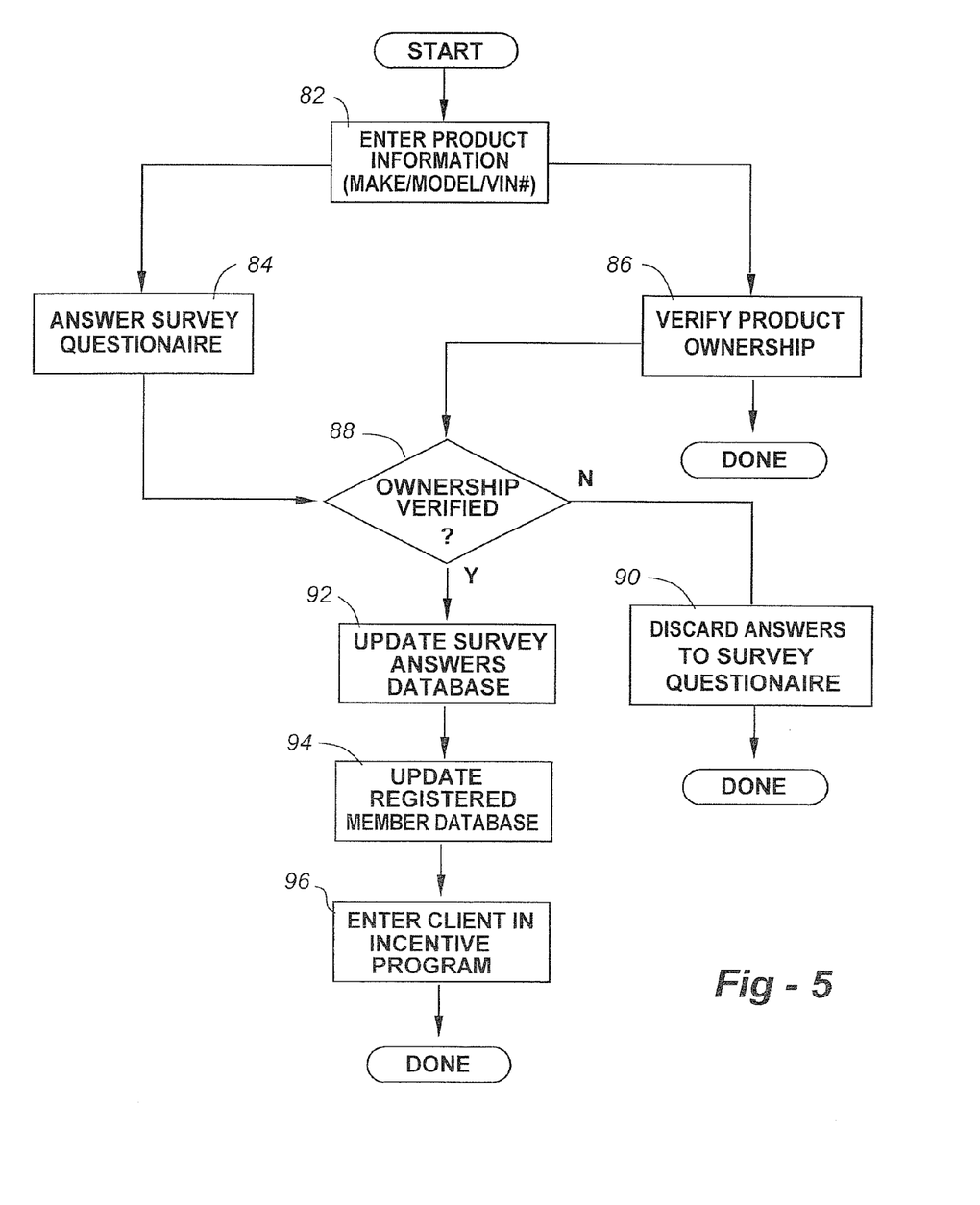
FIG. 5 is a flow diagram illustrating an alternative method to that of FIG. 3.

In preparing a new survey questionnaire, the operating program 24 extracts survey questions from the survey questions database 28 and the Web server 22 queries the client with the survey questions via a Web page 20. The survey questions may be any survey questions relevant to the type of product being surveyed. For example, in the case of an automobile, the initial questions (box 52 in FIG. 3) will ask for the make, model and year of the vehicle, as well as for the vehicle identification number (VIN) of the vehicle. Upon receipt of the VIN number, the Web server 22, via a publicly accessible database or a privately purchased database 50, determines in box 54 if the VIN number correlates a vehicle of the same make and model number as being owned by the client. Ownership verification can be performed in real time, as indicated in this flow diagram, or as a batch process after the survey questionnaire has been completed. The latter process, is illustrated in FIG. 5. If ownership cannot be verified, the client is notified of the situation and referred to the main or previous Web page 20 of the Web site 14.

Figure 3:
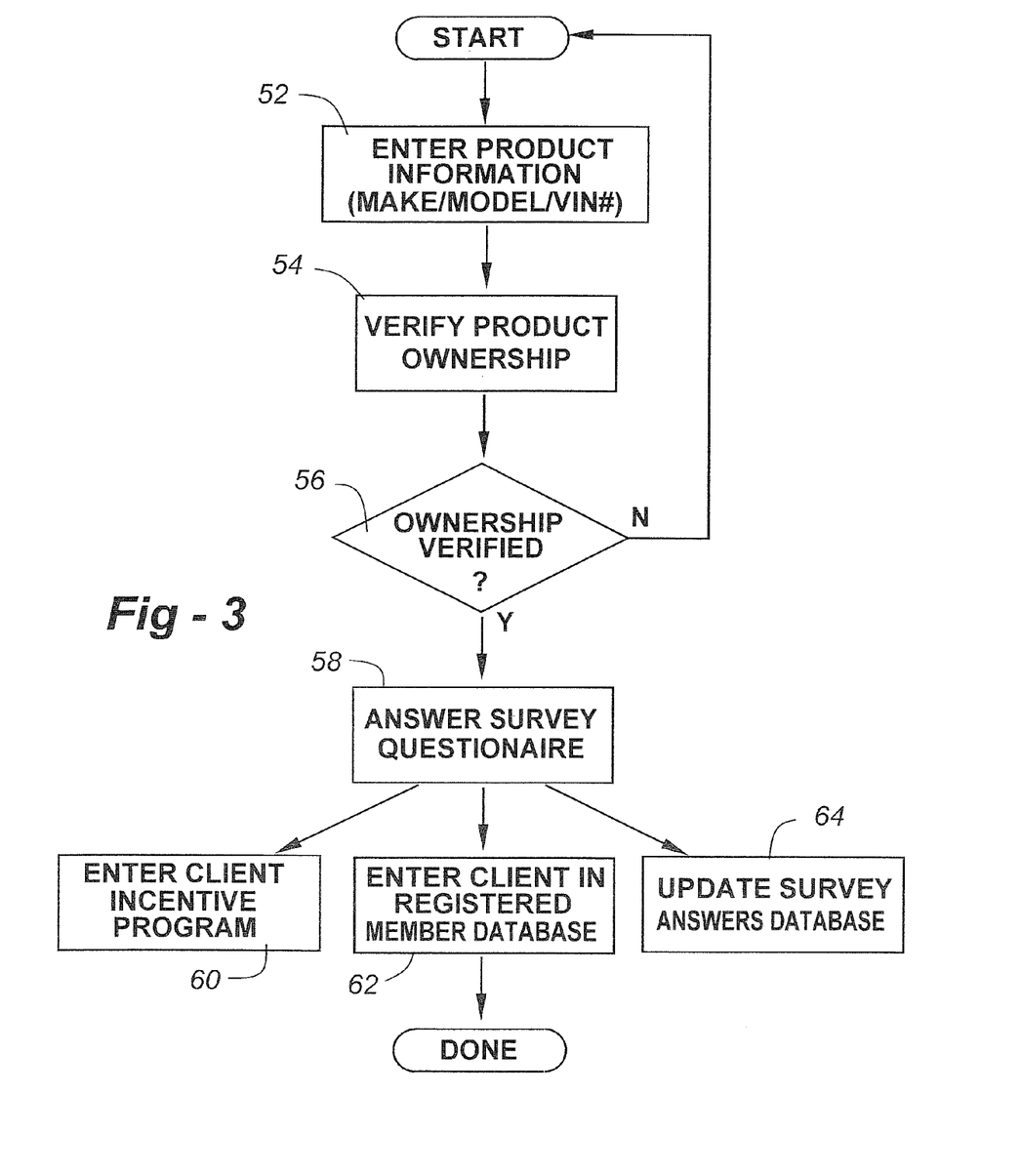
FIG. 3 is a flow diagram illustrating at least some of the steps involved in obtaining survey answers from a registered member of the Web site.

Upon verification of the VIN number and correlating ownership or leasing to the client in box 56, additional survey questions are queried to the client via one or more additional Web pages. Upon completing the survey in box 58, the information entered at the various stages of the Web pages is updated into the survey answers database 30 (at box 64) for future use in compiling and providing survey results. Additionally, information is entered into the registered member's database 26 (at box 62) and the client is entered into an incentive program (at box 60).

Once access is granted to the client to survey results (box 46 of FIG. 2), the operating program 24 will cause the Web server 22 to query the client via a Web page 20 as to which particular survey the client requires. The client will then enter information on the Web page 20, such as the make and model number of an automobile, and the Web server 22, through the operating program 24 will retrieve the cumulative survey results for that make and model number from the survey answers database 30. Those results are then provided by the Web server 22 via Web page 20 to the client.

In updating a prior survey by the client (box 48 of FIG. 2), the client is provided access to a previously answered survey questionnaire by the client and the client is allowed to update those answers requiring updating. Alternatively, the client may be provided with a menu identifying all those surveys in which the client has previously participated. From the menu, the client would then select the survey which the client wants to update. The client is then provided with that particular prior survey questionnaire and permitted to revise or update any of the answers. Upon receipt of the updated information, the survey answers database is updated accordingly.

If the client is not a registered member (box 36), in order to become a registered member (box 38) the procedure proceeds similar to that previously discussed regarding the prior client responding to a new survey. This is illustrated by the flow diagram of FIG. 4. The new client is requested to provide information about himself, such as name and address, in box 66. Additionally, in box 68 the prospective new client is requested to enter information regarding a product for which surveys are being conducted. This initial information will relate to the make and model number as well as the necessary information to determine if the client is the owner of such a specific product. Again in the case of an automobile, the client would be requested to enter the make and model number of the vehicle as well as the VIN number. The VIN number is then checked against the appropriate database 50 in box 70. If the VIN number correlates ownership of the automobile with the prospective client, box 72, the client is then registered as a member in the registered members database 26 in box 74. The client can be assigned a specific registration number or may be permitted to select a password to be used in subsequently gaining access to the full range of features on the survey Web site 14.

Figure 4:
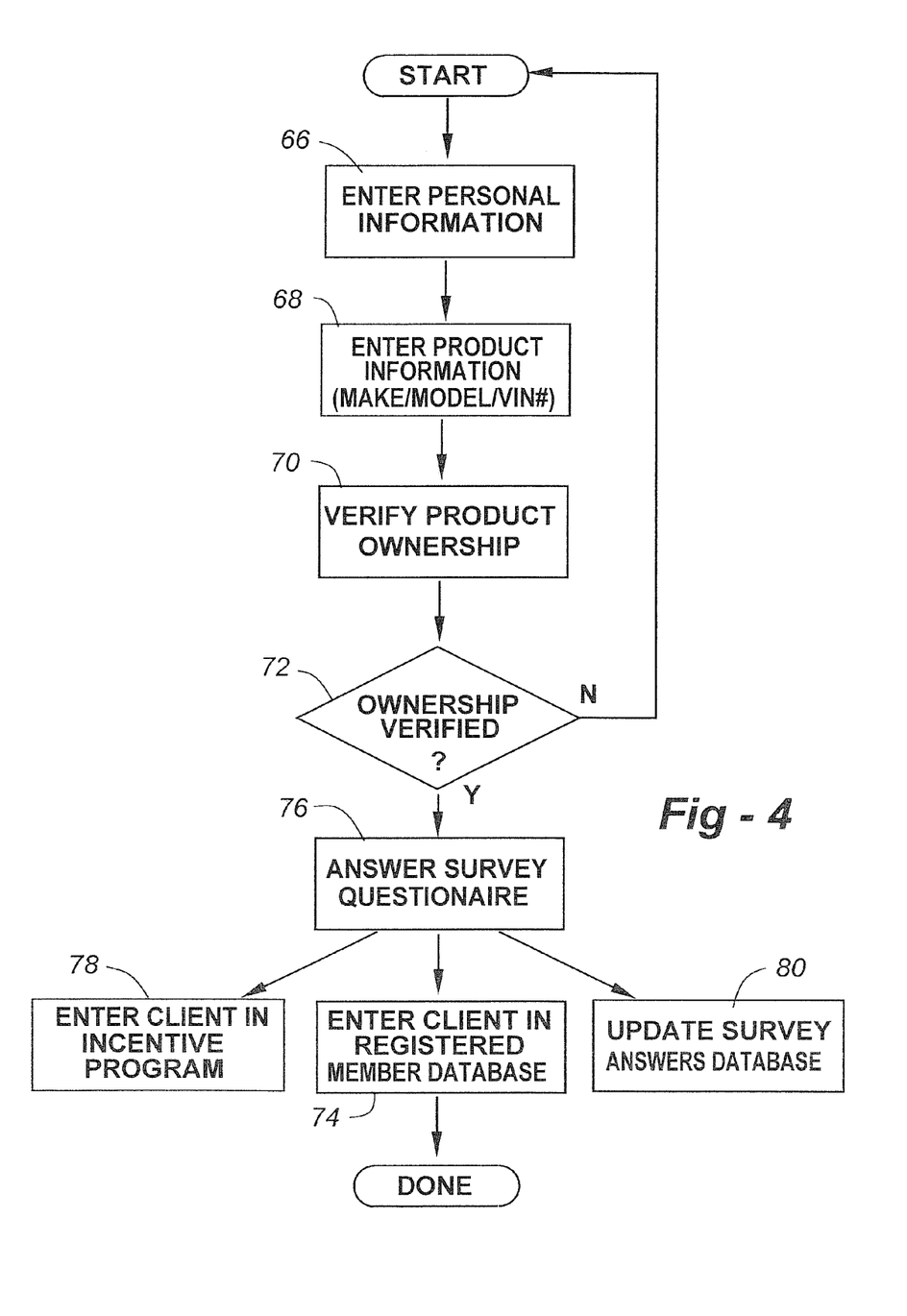
FIG. 4 is a flow diagram, similar to FIG. 3, illustrating at least some of the steps involved in obtaining survey answers from a new user of the Web site.

However, before gaining access to the full range of features on the Web site 14, the newly registered client is required to complete a survey specific to the product previously identified by the client. This is done at box 76 and information is then entered into the survey answers database 30, thereby updating the survey of vehicles of that make and model number in box 80.

In the event the VIN number cannot be correlated to the automobile identified by the client at box 72, access is denied to the full features of the Web site 14 and the client may then again be prompted to become a registered member. The client can then either leave the Web site 14 or try to become a registered member based upon some other product which is being surveyed by the site. In that situation the procedure repeats the inquiry described above.

In an effort to entice individuals to visit the survey Web site 14, become registered members and answers surveys, the system 10 and method of the present invention may include one or more incentives. One contemplated incentive for clients responding to surveys is to enter that client into a drawing where the winner of the drawing has the balance of any loan, lease or credit card paid off by the owner of the survey Web site 14. While not specifically required, it is preferred that the amount of the loan, lease or credit card balance be that for the amount relating to the surveyed product. In the automobile example, the remaining balance of the loan could be the grand prize of the drawing. Alternatively, the grand prize may be one year's worth of payments on the loan or some other amount as determined by the owners of the survey Web site. Entering of the client into the incentive program is done in box 78.

Referring now to FIG. 5, a flow diagram for the batch verification of product ownership methodology is illustrated therein. Continuing with the example of an automobile being the survey product, the initial questions (in box 82) ask for the make, model and year of the vehicle. Additionally, the initial questions will include a request for the VIN number of the vehicle. At this point the process proceeds to box 84 where the client is requested to answer a questionnaire specific to the vehicle identified in box 82. Verification of product ownership in box 86 is delayed until a convenient time where batch verification of products and their ownership can be conducted. The client may be given access to the survey results immediately after completing the survey questionnaire in box 84 even though product verification has not yet been completed. Alternatively, access to the survey results may be delayed for a period of time until product ownership verification can be completed. The client may be required to revisit the Web site 14 to determine if the product verification has been completed or, alternatively, the client may be notified via an email message generated by the Web server 22 that product ownership has been verified or denied and further directing the client how to proceed.

The client's answers to the survey questionnaire in box 84 are handled differently depending on if the product ownership is verified in box 88. If product ownership fails verification, the client's answers to the survey questionnaire in box 84 are discarded in box 90. If product ownership is verified, the survey answers database 30 is then updated in box 92, the registered member database 26 is updated in box 94 and the client may be entered into the incentive program in box 96. If product ownership cannot be confirmed or denied, the client's answers can either be added to the database or discarded, whichever is desired.

4. Conclusion

By providing a method where product ownership is verified, either in real time or in a batch process, prior to the entry of answers to a survey questionnaire into the cumulative results of that survey, the integrity of the survey is prevented from being compromised by individuals having ulterior motives. Additionally, the method and system 10 of the present invention provide an incentive for actual product owners to complete surveys (gaining access to other survey results) as well as provides an opportunity for incentive (payoff of an existing loan balance) to answer numerous surveys.

While the above description constitutes the preferred embodiment of the present invention, it will be appreciated that the invention is susceptible to modification, variation and change without departing from the proper scope and fair meaning of the accompanying claims.

The invention claimed is:

1. A method of collecting and disseminating survey information, comprising the steps of:
    providing a website with hardware and software server components, the components including non-standard or specialized components that perform services for web site users, the specialized components including a questionnaire database and a survey answers database storing previously collected survey results relating to particular subject matter, and wherein the previously collected survey results include a composite survey response;
    establishing communication via the internet between a client and the web site;
    receiving, at the web site, a request from the client to view a composite survey response;
    providing the client with a survey questionnaire from the survey questionnaire database directed to subject matter that is unrelated to the subject matter of the composite survey response;
    providing access to the composite survey response to the client only if the web site receives a response to the survey questionnaire from the client;
    and rejecting the client's request for the survey results if a response to the survey questionnaire is not received from the client.

2. The method of claim 1, further comprising the step of assimilating the survey response into the composite survey response and the survey answers database.

3. The method of claim 1 wherein the step of providing the client with the survey questionnaire includes requesting identifying indicia from the client.

4. The method of claim 3, wherein the identifying indicia is a product identification number.

5. The method of claim 3, wherein the identifying indicia is a vehicle identification number (VIN).

6. The method of claim 3, further including the step of correlating the identifying indicia to a database.

7. The method of claim 3, further including the steps of:
    correlating the identifying indicia with a database to determine if the client is a registered member;
    and providing access to the previously collected survey results only if the client is also a registered member.

8. The method of claim 6, wherein the correlating step determines if a relationship exists between the identifying indicia and the subject matter of the survey questionnaire.

9. The method of claim 6, wherein the correlating step determines if a relationship exists between the identifying indicia and the client.

10. The method of claim 6, wherein the correlating step determines if a relationship exists between the identifying indicia and the client and the survey questionnaire.

11. The method of claim 8, wherein the client is denied access to the previously collected survey results if no relationship is found between the identifying indicia and the subject matter of the survey questionnaire.

12. The method of claim 9, wherein the client is denied access to the previously collected survey results if no relationship is found between the identifying indicia and the client.

13. The method of claim 10, wherein the client is denied access to the previously collected survey results if no relationship is found between the identifying indicia, the client and the subject matter of the survey questionnaire.

* * * * *